(12) United States Patent
Van Manen et al.

(10) Patent No.: US 8,554,484 B2
(45) Date of Patent: Oct. 8, 2013

(54) RECONSTRUCTING SEISMIC WAVEFIELDS

(75) Inventors: Dirk-Jan Van Manen, Reigate (GB); Massimiliano Vassallo, Brighton (GB); Ali Ozbek, Milton (GB)

(73) Assignee: WesternGeco L.L.C., Houston, TX (US)

( * ) Notice: Subject to any disclaimer, the term of this patent is extended or adjusted under 35 U.S.C. 154(b) by 563 days.

(21) Appl. No.: 12/370,684

(22) Filed: Feb. 13, 2009

(65) Prior Publication Data
US 2010/0211319 A1   Aug. 19, 2010

(51) Int. Cl.
*G01V 1/00* (2006.01)

(52) U.S. Cl.
USPC ............. 702/14; 702/18; 702/32; 702/159

(58) Field of Classification Search
USPC ......... 702/14, 18, 32, 159; 703/5; 367/7, 8, 9; 324/323, 328; 250/253; 181/101
See application file for complete search history.

(56) References Cited

U.S. PATENT DOCUMENTS

| | | | |
|---|---|---|---|
| 4,397,004 A | 8/1983 | Bronislaw | |
| 4,594,693 A | 6/1986 | Pann et al. | |
| 4,616,320 A | 10/1986 | Kerr et al. | |
| 4,922,465 A * | 5/1990 | Pieprzak et al. | 367/38 |
| 5,172,345 A | 12/1992 | van der Poel | |
| 5,550,786 A | 8/1996 | Allen | |
| 5,848,379 A | 12/1998 | Bishop | |
| 6,021,379 A * | 2/2000 | Duren et al. | 702/16 |
| 6,512,980 B1 | 1/2003 | Barr | |
| 6,556,009 B2 | 4/2003 | Kellman et al. | |
| 6,625,213 B2 | 9/2003 | Bottreau et al. | |
| 6,775,618 B1 | 8/2004 | Robertsson et al. | |
| 6,801,473 B2 | 10/2004 | Matteucci et al. | |
| 6,834,236 B2 | 12/2004 | Iranpour | |
| 6,876,927 B1 | 4/2005 | Chatelain et al. | |
| 6,894,948 B2 | 5/2005 | Brittan et al. | |
| 7,286,690 B2 | 10/2007 | Kelly | |
| 7,639,564 B2 | 12/2009 | Paffenholtz et al. | |
| 7,676,327 B2 | 3/2010 | Ozdemir et al. | |
| 7,715,988 B2 | 5/2010 | Robertsson et al. | |
| 7,817,495 B2 | 10/2010 | Ozbek et al. | |
| 7,957,906 B2 | 6/2011 | Turnbull | |
| 8,116,166 B2 | 2/2012 | Robertsson et al. | |

(Continued)

FOREIGN PATENT DOCUMENTS

GB    2450122    12/2008

OTHER PUBLICATIONS

Eldar, Yonina C. & Oppenheim, Alan V.; "Filterbank Reconstruction of Bandlimited Signals from Nonuniform and Generalized Samples"; Oct. 2000; IEEE Transactions on Signal Processing; vol. 48, No. 10; p. 1.*

(Continued)

*Primary Examiner* — Sujoy Kundu
*Assistant Examiner* — Elias Desta

(57) ABSTRACT

A technique includes receiving seismic data acquired in a seismic survey in the vicinity of a reflecting interface. The survey has an associated undersampled direction. The technique includes providing second data indicative of discrete samples of incident and reflected components of a continuous seismic wavefield along the undersampled direction and relating the discrete samples to a linear combination of the continuous incident and reflected seismic wavefields using at least one linear filter. Based on the relationship, an unaliased representation of the linear combination of the continuous incident and reflected seismic wavefields is constructed.

22 Claims, 7 Drawing Sheets

(56) References Cited

U.S. PATENT DOCUMENTS

| | | | |
|---|---|---|---|
| 2003/0105592 | A1 | 6/2003 | Fokkema et al. |
| 2005/0013194 | A1* | 1/2005 | Vaage et al. ............... 367/24 |
| 2005/0195686 | A1* | 9/2005 | Vaage et al. ............... 367/21 |
| 2008/0089174 | A1* | 4/2008 | Sollner et al. ............... 367/21 |
| 2008/0279043 | A1 | 11/2008 | Soubaras |
| 2009/0122641 | A1* | 5/2009 | Hillesund et al. ............... 367/20 |
| 2009/0296523 | A1 | 12/2009 | Ozbek et al. |
| 2010/0002541 | A1 | 1/2010 | Ozdemir et al. |
| 2010/0030479 | A1 | 2/2010 | Higginbotham et al. |
| 2010/0097888 | A1* | 4/2010 | Neelamani et al. ............... 367/53 |
| 2010/0182873 | A1* | 7/2010 | Kluver ............... 367/21 |
| 2010/0211320 | A1 | 8/2010 | Vassallo et al. |
| 2010/0211321 | A1 | 8/2010 | Ozdemir et al. |
| 2010/0211322 | A1 | 8/2010 | Vassallo et al. |
| 2010/0211323 | A1 | 8/2010 | Ozdemir et al. |
| 2010/0299069 | A1 | 11/2010 | Moore |
| 2010/0329077 | A1 | 12/2010 | Ozbek et al. |

OTHER PUBLICATIONS

Bolondi, et al., Offset Continuation of Seismic Sections, Geophysical Prospecting, 1982, pp. 813-828, vol. 30.

Brown, Multi-Channel Sampling of Low-Pass Signals, IEEE Transactions on Circuits and Systems, Feb. 1981, pp. 101-106, vol. CAS-28, No. 2.

Linden, A Discussion of Sampling Theorems, Proceedings of the IRE, 1959, pp. 1219-1226.

Mallat, Matching Pursuits with Time-Frequency Dictionaries, IEEE Transactions on Circuits and Systems, Dec. 1993, pp. 3397-3415, vol. 41, No. 12.

Ozdemir, et al., Interpolation of Irregularly Sampled Data by Matching Pursuit, 70th EAGE Conference, Jun. 2008.

Papoulis, Generalized Sampling Expansion, IEEE Transactions on Circuits and Systems, Nov. 1977, vol. CAS-24, No. 11.

PCT Search Report, dated Nov. 30, 2010, Application No. PCT/US2010/023694.

International Search Report and Written Opinion of PCT Application No. PCT/US2010/023814 dated Sep. 29, 2010: pp. 1-8.

International Search Report of PCT Application No. PCT/US2010/023815 dated Nov. 30, 2010: pp. 1-4.

Amundsen et al., "Rough-sea deghosting of streamer seismic data using pressure gradient approximations," Geophysics, Jan.-Feb. 2005, vol. 70(1): pp. V1-V9.

Lang, "Kriging Interpolation," Apr. 24, 2001, obtained from <http://www.nbb.cornell.edu/neurobio/land/oldstudentprojects/cs490-94to95/clang/kriging.html>: pp. 1-6.

Robertsson et al., "On the use of multicomponent streamer recordings for reconstruction of pressure wavefields in the crossline direction," Geophysics, Sep.-Oct. 2008, vol. 73(5): pp. A45-A49.

* cited by examiner

RECONSTRUCTING SEISMIC WAVEFIELDS

BACKGROUND

The invention generally relates to reconstructing seismic wavefields.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes receiving seismic data acquired in a seismic survey in the vicinity of a reflecting interface. The survey has an associated undersampled direction. The technique includes providing second data indicative of discrete samples of incident and reflected components of a continuous seismic wavefield along the undersampled direction. The technique includes relating the discrete samples to a linear combination of the continuous incident and reflected seismic wavefields using at least one linear filter. Based on the relationships, an unaliased representation of the linear combination of the continuous incident and reflected seismic wavefields is constructed.

In another embodiment of the invention, a system includes an interface to receive seismic data acquired in a seismic survey in the vicinity of a reflecting interface. The survey has an associated undersampled direction. The system includes a processor to process second data, which are derived from the seismic data and are indicative of discrete samples of incident and reflected components of a continuous seismic wavefield along the undersampled direction. The discrete samples are modeled by the processor as being generated by the application of at least one linear filter to a linear combination of the continuous incident and reflected seismic wavefields. The processing of the second data includes constructing an unaliased representation of the linear combination of the continuous incident and reflected seismic wavefields based on the model In yet another embodiment of the invention, a method includes designing a towed seismic survey. The designing includes designing the survey to enhance reconstruction of a seismic wavefield along an undersampled direction.

Advantages and other features of the invention will become apparent from the following drawing, description and claims.

DETAILED DESCRIPTION

Figure 1:
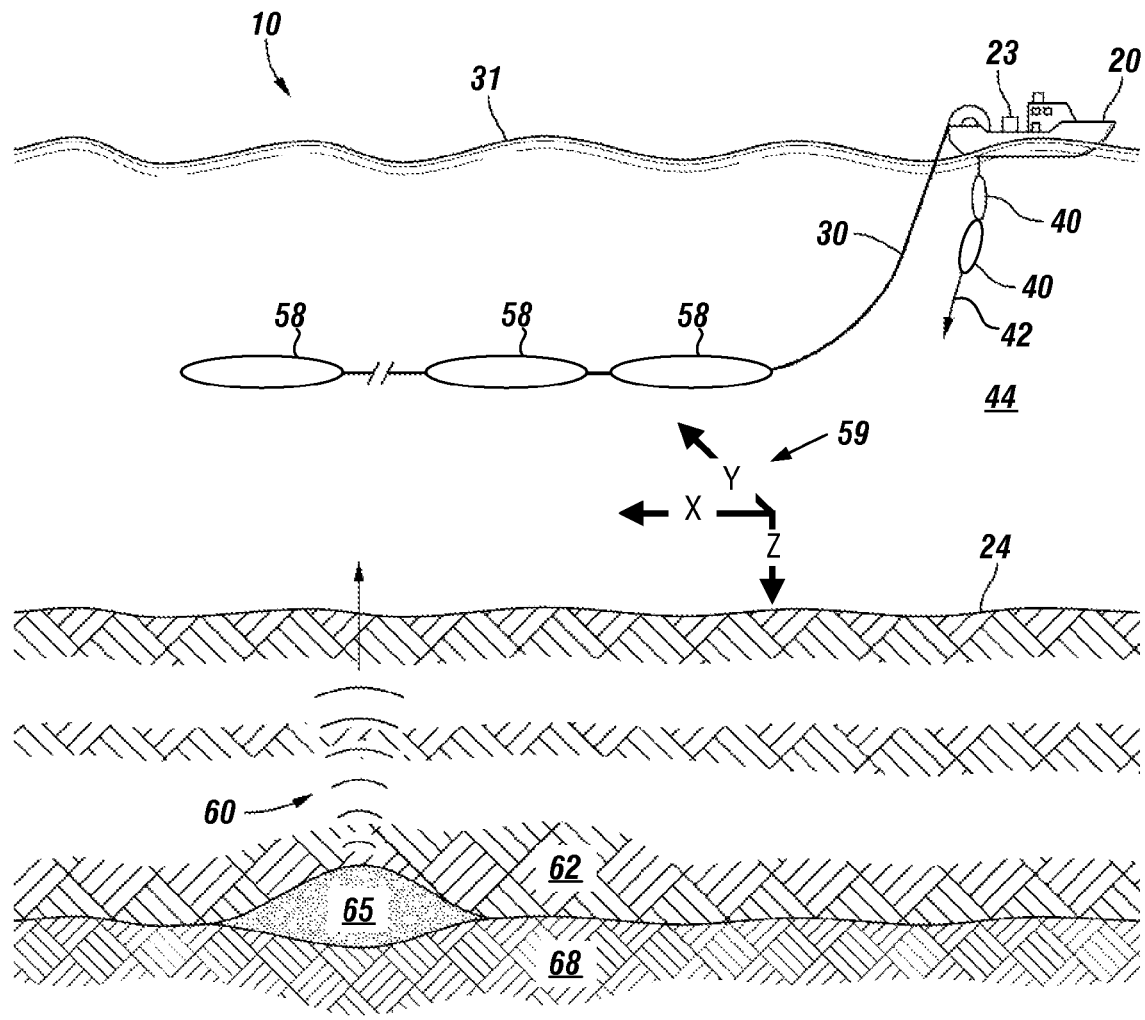
FIG. 1 is a schematic diagram of a marine seismic acquisition system according to an embodiment of the invention.

FIG. 1 depicts an embodiment 10 of a marine-based seismic data acquisition system in accordance with some embodiments of the invention. In the system 10, a survey vessel 20 tows one or more seismic streamers 30 (one exemplary streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. The streamers 30 contain seismic sensors 58, which may be, depending on the particular embodiment of the invention, hydrophones (as one non-limiting example) to acquire pressure data or multi-component sensors. For embodiments of the invention in which the sensors 58 are multi-component sensors (as another non-limiting example), each sensor is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the sensor. It is noted that the multi-component seismic sensor may be implemented as a single device (as depicted in FIG. 1) or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the partial derivative of the pressure data with respect to the inline direction.

The marine seismic data acquisition system 10 includes seismic sources 40 (two exemplary seismic sources 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The acoustic signals 42 that are created by the sources 40 produce corresponding subsurface-reflected acoustic signals, or pressure waves 60, which are sensed by the seismic sensors 58. It is noted that the pressure waves that are received and sensed by the seismic sensors 58 include "up going" or "incident" pressure waves that propagate to the sensors 58 after reflection in the subsurface, as well as "down going" or "reflected" pressure waves that are produced by reflections of the pressure waves 60 from an air-water boundary, or free surface 31.

The seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular seismic sensor 58 may provide a trace, which corresponds to a measure of a pressure wavefield by its hydrophone 55; and the sensor 58 may provide (depending on the particular embodiment of the invention) one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system that may be, for example, located on land or on the vessel 20. Thus, many variations are possible and are within the scope of the appended claims.

A particular seismic source 40 may be formed from an array of seismic source elements (such as air guns, for example) that may be arranged in strings (gun strings, for example) of the array. Alternatively, a particular seismic source 40 may be formed from one or a predetermined number of air guns of an array, may be formed from multiple arrays, etc. Regardless of the particular composition of the seismic sources, the sources may be fired in a particular time sequence during the survey.

Figure 2:
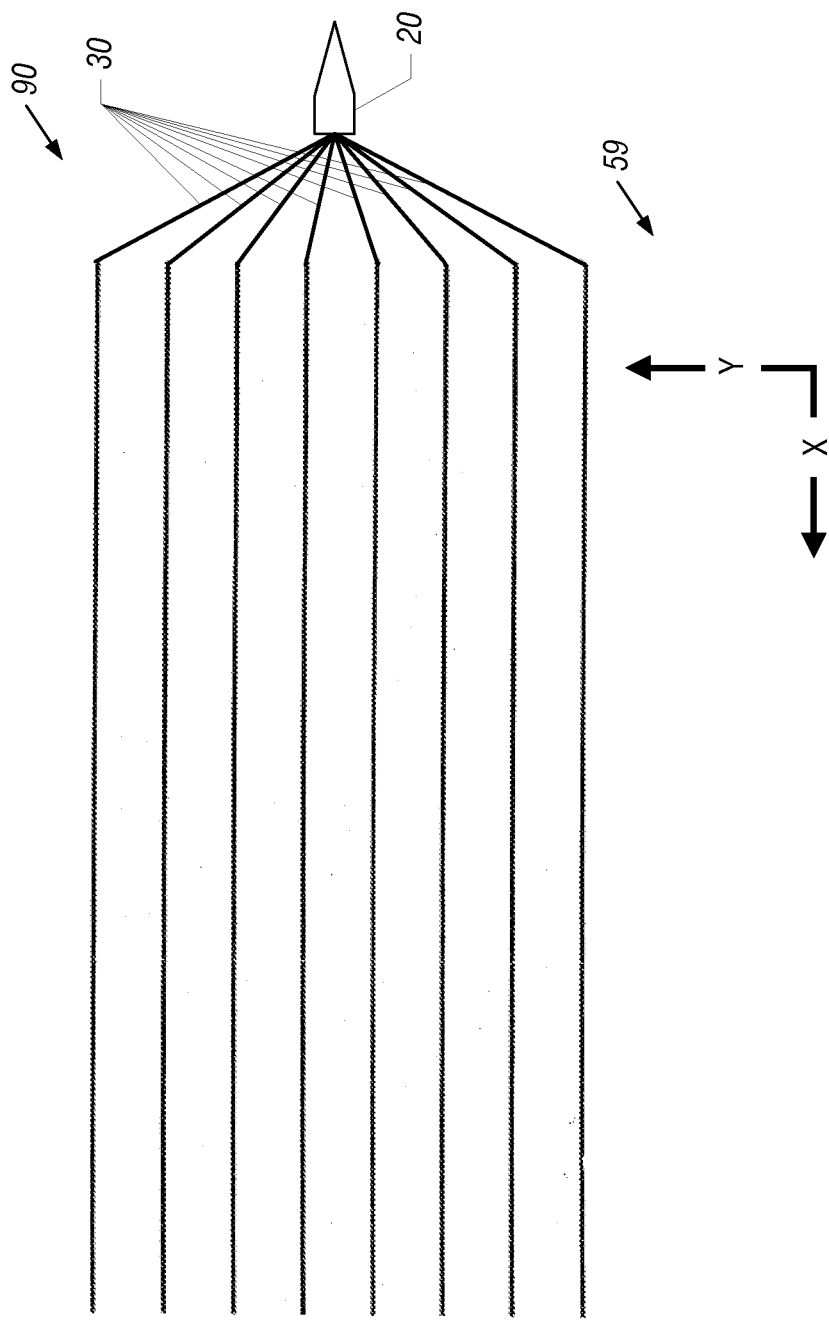
FIG. 2 is a top view of the acquisition system of FIG. 1 according to an embodiment of the invention.

Referring to FIG. 2, in accordance with embodiments of the invention, a towed marine seismic survey may have a spread 90 of streamers 30 that are spaced apart in the crossline (y) direction, which means that the seismic sensors are rather sparsely spaced apart in the crossline direction, as compared to the inline (x) spacing of the seismic sensors. As such, the seismic wavefield may be relatively densely sampled in the inline (x) direction while being sparsely sampled in the crossline direction to such a degree that the sampled seismic wavefield may be aliased in the crossline direction. In other words, the data acquired from the seismic sensors do not, in general, contain sufficient information to produce an unaliased construction (i.e., an unaliased continuous interpolation) of the seismic wavefield in the crossline direction. As a more specific example, the seismic spread 90 may contain pressure and particle velocity sensors, which have an associated sparse crossline spacing. Therefore, the data that are acquired by each type of sensors individually may not be solely sufficient to reconstruct the unaliased upgoing wavefield in the crossline direction. However, in accordance with embodiments of the invention described herein, the relationship between the upgoing and downgoing wavefields at the free surface 31 (see FIG. 1) is used to provide additional information that permits construction of an unaliased continuous representation of the upgoing pressure and/or particle velocity wavefield in the crossline direction. In the context of this application, "unaliased" means substantially free of aliasing.

The upgoing and downgoing vertical particle velocity wavefields are related through the reflection at the free surface 31. If the source depth (called "$z_s$") is larger than the streamer depth (called "$z_r$") or, equivalently, the direct wave has been removed from the acquired seismic data, then the relationship between the upgoing and downgoing vertical component wavefields may be described as follows:

$$V_z^+(\omega,k_x,k_y)=\exp(\pm i2k_z z_r)V_z^-(\omega,k_x,k_y), \quad \text{Eq. 1}$$

where "$V_z^-(\omega,k_x,k_y)$" represents the downgoing vertical component of the particle velocity; "$V_z^-(\omega,k_x,k_y)$" represents the upgoing vertical component of the particle velocity; "$\omega$" represents the frequency; "$k_x$" represents the inline wavenumber; "$k_y$" represents the crossline wavenumber; "$k_z=\sqrt{(\omega/c)^2-k_x^2-k_y^2}$" represents the vertical wavenumber; and "c" represents the sound speed in the water layer. Note that the sign in the exponent on the right-hand side of equation 1 depends on the sign convention for the temporal Fourier transform and should be chosen such that for a positive extrapolation distance (twice the receiver depth "$z_r$") multiplication of the complex exponential with the upgoing wavefield produces the expected angle-dependent delay. In the following, without loss of generality, it is assumed that the sign in the exponent has been resolved as positive.

Due to the reflection at the free surface 31, the downgoing vertical component wavefield contains different crossline spatial information than the upgoing vertical component wavefield. That is, in theory, if a certain event with a non-zero crossline incidence angle is recorded in the downgoing wavefield and the corresponding ray is traced back to the free surface reflected and extrapolated back to the streamer level, then a location is derived where the upgoing wave was not measured. However, it is typically not possible to use the above-described ray tracing. Nevertheless, the information implicit in the downgoing wavefield about the upgoing wavefield, through the reflection at the free surface may be utilized to construct the upgoing particle motion wavefield as follows.

In general, due to the relationship that is set forth in Eq. 1, one or more linear filters may be defined for purposes of relating the upgoing and downgoing samples of the vertical particle velocity wavefield to any linear combination of the up- and downgoing wavefield. More specifically, in one particular embodiment, samples of the upgoing $Vz^-(t,x,y_i)$ and downgoing $Vz^+(t,x,y_i)$ vertical particle motion wavefields (e.g., samples, which may be indirectly calculated, as further described herein) may be viewed as being obtained at the output of two linear filters that receive the upgoing vertical particle velocity wavefield. The output of these filters is sampled at one half the Nyquist rate in the crossline direction and at the full Nyquist rate in the inline direction. The two linear filters are $H_1(\omega,k_x,k_y)=1$ and $H_2(\omega,k_x,k_y)=\exp(i2k_zz_r)$ (see Eq. 1). Note that for this and other particular desired linear combinations of the continuous incident and continuous reflected wavefields, one of the filters may have a particularly simple form (unity) and therefore, by some, may be considered not to be a filter at all. As can be appreciated by one of skill in the art, for this reason, in the description herein, the terminology "one or more linear filters," or "two linear filters" is used interchangeably to describe this system.

As can be appreciated by one of skill in the art, that array measurements of two fundamental quantities in a locally (i.e., around the array) homogeneous medium, is sufficient to directionally decompose the wavefield with respect to the measurement array. In the case of an acoustic medium (i.e., a medium supporting acoustic wave propagation), and a planar horizontal array, the two fundamental quantities may be pressure and the vertical component of particle velocity. In the case of an elastic medium (i.e., a medium supporting elastic wave propagation), and a planar horizontal array, the two fundamental quantities may be the displacement and vertical traction vectors.

Furthermore, as can be appreciated by one of skill in the art, for wavefields that have been directionally decomposed and that are sufficiently sampled, the relations between the different components of particle motion and the pressure (in the acoustic case) are relatively simple, and one component may be computed from the other by spatial filtering. Thus, as an example, because the upgoing pressure can be obtained by simple spatial filtering of the upgoing vertical component of particle velocity, it is also possible to reconstruct the upgoing pressure directly from the samples of the up- and downgoing vertical particle velocity. Such variations are contemplated and within the scope of the appended claims.

Given this relationship, a construction algorithm, such as generalized sampling expansion (GSE) algorithm may be applied for purposes of determining the unaliased continuous representation of the upgoing vertical particle velocity wavefield in the crossline direction. More specifically, as described in Papoulis, A., 1977, Generalized Sampling Expansion, IEEE Trans. Cir. Syst., Vol. 24, No. 11, pp. 652-654, a band-limited function x(t) may be uniquely determined in terms of the samples $g_k(nT)$ (sampled at $1/m$ of the Nyquist rate) of the responses $g_k(t)$ of m linear systems (k=1, ..., m) with the input x(t). Application of the GSE is described below for two approaches, according to different embodiments of the invention.

In the first approach, two linear filters $H_1$ and $H_2$ are first defined, as set forth below:

$$H_1(\overline{\omega}, \overline{k}_x, k_y) = 1, \quad \text{Eq. 2}$$

and $$H_2(\overline{\omega}, \overline{k}_x, k_y) = \exp(i2k_zk_r) \quad \text{Eq. 3}$$
$$= \exp\left(i2\sqrt{(\overline{\omega}/c)^2 - \overline{k}_x^2 - k_y^2}\, z_r\right).$$

As can be seen from Eqs. 2 and 3, the linear filters are functions of frequency and inline horizontal wavenumber, as well as the crossline horizontal wavenumber. The problem is solved for a fixed frequency and a fixed inline horizontal wavenumber, as denoted by the overbar above these quantities in Eqs. 2 and 3. Pursuant to the GSE, the following system may be defined:

$$H_1(k_y)Y_1(k_y,y) + H_2(k_y)Y_2(k_y,y) = 1, \text{ and} \quad \text{Eq. 4}$$

$$H_1(k_y+c)Y_1(k_y,y) + H_2(k_y+c)Y_2(k_y,y) = \exp(icy), \quad \text{Eq. 5}$$

where "c" represents "σ," the Nyquist rate; "y" represents any number; and "$k_y$" represents a number between σ and −σ+c. By using Eqs. 2 and 3 in Eqs. 4 and 5, the following relationships may be obtained:

$$Y_1(k_y, y) + \exp\left(i2\sqrt{(\overline{\omega}/c)^2 - \overline{k}_x^2 - k_y^2}\, z_r\right)Y_2(k_y, y) = 1, \quad \text{Eq. 6}$$

and $$Y_1(k_y, y) + \exp\left(i2\sqrt{(\overline{\omega}/c)^2 - \overline{k}_x^2 - (k_y+c)^2}\, z_r\right)Y_2(k_y, y) = \exp(icy). \quad \text{Eq. 7}$$

Eqs. 6 and 7 define a system that may be inverted to yield two functions $Y_1$ and $Y_2$ of $k_y$ and y. The determinant of the system that is defined in Eqs. 6 and 7 is the difference between two complex exponential functions, as set forth below:

$$\det(H) = \exp\left(i2\sqrt{(\overline{\omega}/c)^2 - \overline{k}_x^2 - (k_y+c)^2}\, z_r\right) - \quad \text{Eq. 8}$$
$$\exp\left(i2\sqrt{(\overline{\omega}/c)^2 - \overline{k}_x^2 - k_y^2}\, z_r\right).$$

Solving the system defined in Eqs. 6 and 7, yields the following relationship:

$$\begin{pmatrix} Y_1(k_y, y) \\ Y_2(k_y, y) \end{pmatrix} = \quad \text{Eq. 9}$$
$$\frac{1}{H_2(k_y+c) - H_2(k_y)} \begin{pmatrix} H_2(k_y+c) & -H_2(k_y) \\ -1 & 1 \end{pmatrix} \begin{pmatrix} 1 \\ \exp(icy) \end{pmatrix},$$

which may be alternatively expressed as follows:

$$Y_1(k_y, y) = \frac{\exp\left(i2\sqrt{(\bar{\omega}/c)^2 - \bar{k}_x^2 - (k_y+c)^2}\, z_r\right) - \exp(icy) \cdot \exp\left(i2\sqrt{(\bar{\omega}/c)^2 - \bar{k}_x^2 - k_y^2}\, z_r\right)}{\exp\left(i2\sqrt{(\bar{\omega}/c)^2 - \bar{k}_x^2 - (k_y+c)^2}\, z_r\right) - \exp\left(i2\sqrt{(\bar{\omega}/c)^2 - \bar{k}_x^2 - k_y^2}\, z_r\right)},$$

Eq. 10 and $$Y_2(k_y, y) = \frac{\exp(icy)}{\exp\left(i2\sqrt{(\bar{\omega}/c)^2 - \bar{k}_x^2 - (k_y+c)^2}\, z_r\right) - \exp\left(i2\sqrt{(\bar{\omega}/c)^2 - \bar{k}_x^2 - k_y^2}\, z_r\right)}.$$

Eq. 11

Pursuant to the GSE, the functions $y_1(y)$ and $y_2(y)$ are determined as follows:

$$y_1(y) = \frac{1}{c}\int_{-\sigma}^{-\sigma+c} Y_1(k_y, y)\exp(ik_y y)\, dk_y,$$

Eq. 12 and $$y_2(y) = \frac{1}{c}\int_{-\sigma}^{-\sigma+c} Y_2(k_y, y)\exp(ik_y y)\, dk_y.$$

Eq. 13

Given the functions $y_1(y)$ and $y_2(y)$ determined using Eqs. 12 and 13, respectively, the de-aliased, continuous upgoing wavefield may be determined as follows for a fixed radial frequency and a fixed inline horizontal wavenumber:

$$V_z^-(y) = \sum_{n=-\infty}^{\infty}[V_z^-(nY)y_1(y-nY) + V_z^+(nY)Y_2(y-nY)].$$

Eq. 14

It is noted that in Eqs. 1-14, infinite regularly sampled data has been assumed. In practice, these infinite series may be truncated after some finite, but large, n. Thus, the various embodiments of the invention are neither limited to regular sampling nor infinite sampling, as other embodiments are contemplated and are within the scope of the appended claims.

In practice, it may not be straightforward to evaluate the integrals for $y_1(y)$ and $y_2(y)$, as set forth in Eqs. 12 and 13, especially since these integrals are mixed domain integrals. Therefore, in accordance with other embodiments of the invention, a different approach may be used for purposes of performing the GSE, which does not rely on the evaluation of any integrals. However, if the functions $y_1(y)$ and $y_2(y)$ may be obtained either analytically or by numerical quadrature, then the crossline reconstructed, dealiased upgoing wavefield may be obtained using the approach that is set forth above.

The alternative approach avoids the mixed domain integrals and may be applied in the crossline space or crossline wavenumber domain directly, as set forth in Brown, J. L., 1981, Multi-Channel Sampling of Low-Pass Signals, IEEE Trans. Cir. Syst., Vol. 28, No. 2, pp. 101-106.

In this approach, a forward system matrix $A(k_y)$ may be defined as follows:

$$A(k_y) = \begin{pmatrix} H_1(k_y) & H_2(k_y) \\ H_1(k_y+c) & H_2(k_y+c) \end{pmatrix}.$$

Eq. 15

In the matrix $A(k_y)$, $H_1(k_y)$ and $H_2(k_y)$ are defined in Eqs. 2 and 3 above. For crossline horizontal wavenumbers in the first subinterval $(\sigma, 0)$, the reconstruction functions $P_1(k_y)$ and $P_2(k_y)$ may be computed from the inverse of the matrix $A(k_y)$ as follows:

$$P_j(k_y+(k-1)\sigma) = T_1 b_{jk}(k_y),$$

Eq. 16 where "$b_{jk}(k_y)$" is the $jk^{th}$ element of the inverse of the matrix $A(k_y)$; and $T_1 = 2\pi/\sigma$. The terms of the inverse matrix effectively determine $P_1(k_y)$ and $P_2(k_y)$ on the full interval $(-\sigma, \sigma)$. The reconstruction functions $P_1(k_y)$ and $P_2(k_y)$ may then be inverse Fourier transformed to the space domain to provide the $y_1(y)$ and $y_2(y)$ functions, respectively. The crossline reconstructed dealiased upgoing wavefield may then be obtained using Eq. 14. Alternatively, the reconstruction may be performed directly in the crossline wavenumber domain using the reconstruction functions in Eq. 16 above.

Figure 3:
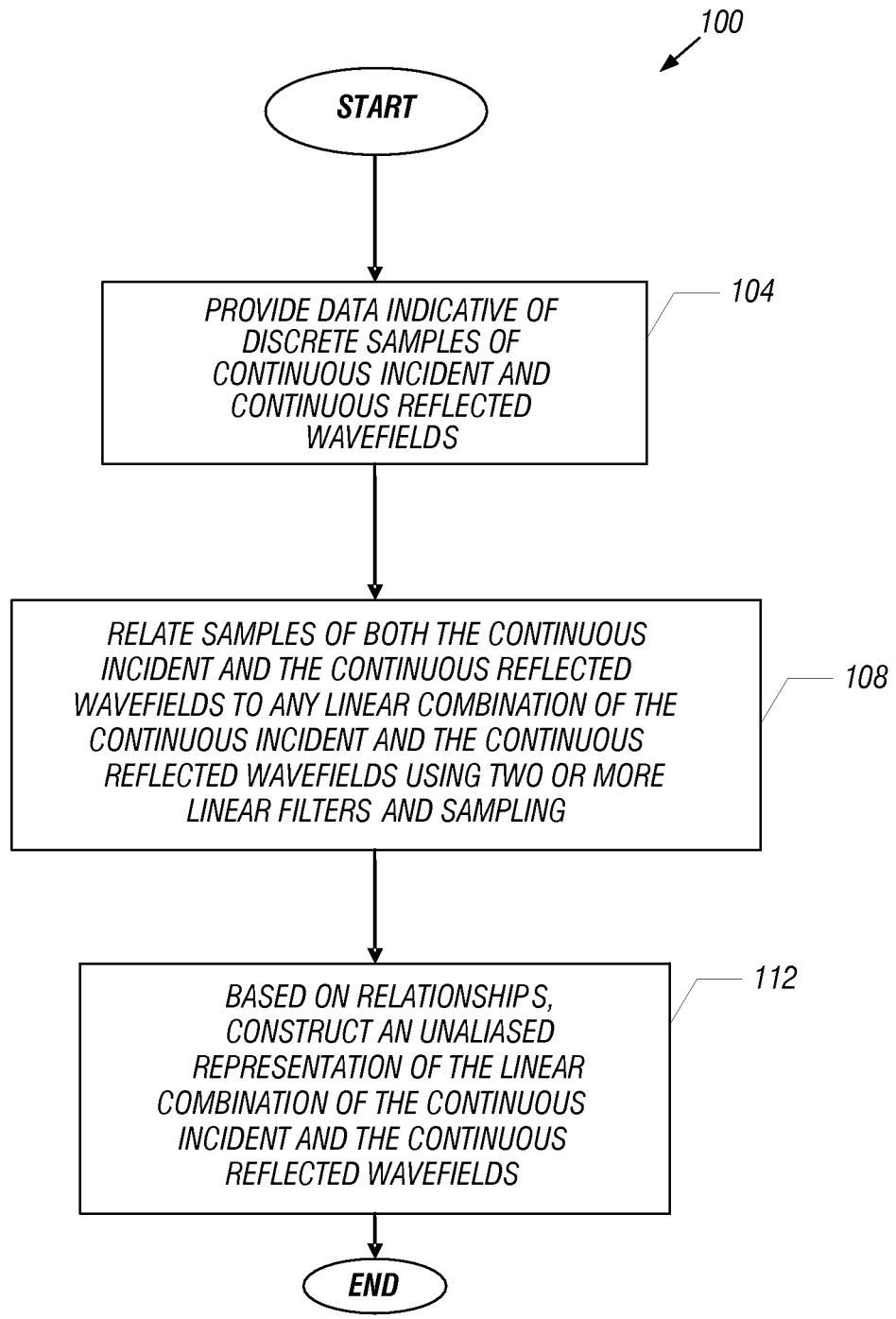
FIG. 3 is a flow diagram depicting a technique to construct an unaliased representation of a continuous upgoing vertical component of a seismic wavefield in the crossline direction according to an embodiment of the invention.

Thus, referring to FIG. 3, in accordance with some embodiments of the invention, a technique 100 may be used for purposes of constructing an unaliased representation of a linear combination of the continuous incident and the continuous reflected seismic wavefield. Pursuant to the technique 100, data, which are indicative of discrete samples of continuous incident and continuous reflected wavefields are provided (block 104); and the samples of both the continuous incident and the continuous reflected wavefields are related (block 108) to any linear combination of the continuous incident and continuous reflected wavefields using one or more linear filters and sampling. Based on these relationships, an unaliased representation of a linear combination of the continuous incident and continuous reflected wavefields may be constructed, pursuant to block 112.

It is noted that the techniques and systems that are described herein are not limited to the crossline reconstruction of upgoing vertical particle velocity wavefields. As non-limiting examples, the techniques and systems that are described herein may equally be applied to the crossline reconstruction of an upgoing pressure wavefield, or upgoing crossline components of the particle velocity wavefield, provided that these components may be correctly decomposed into upgoing and downgoing wavefields at the sensor locations.

Additionally, although embodiments of the invention have been described herein where the upgoing and downgoing wavefields are related through reflection at the free surface 31, the techniques and systems that are described herein may likewise be applied to reflections at other surfaces, such as a reflection at a rigid surface or reflection at any other surface with a known or estimated reflection coefficient.

In accordance with some embodiments of the invention, the "samples" of the upgoing and downgoing wavefields are calculated from other acquired seismic measurements and thus, are not directly sampled. For example, the particle motion sensors of the seismic spread sample the total particle motion wavefield and do not decompose the particle motion wavefield into the upgoing and downgoing components. Therefore, in accordance with some embodiments of the invention, one or more processing steps may be applied for purposes of deriving the sampled upgoing and downgoing quantities that are then further processed to construct the unaliased continuous upgoing seismic wavefield. As a specific example, in accordance with some embodiments of the invention, techniques and systems may be applied to preprocess the seismic data similar to those described in U.S. patent application Ser. No. 12/169,260, entitled "DEGHOSTING SEISMIC DATA," which was filed on Jul. 8, 2008, and is hereby incorporated by reference in its entirety. As described in this patent application, a technique 150 that is generally depicted in FIG. 4 may be used for purposes of processing acquired seismic data to generate data, which are indicative of the upgoing and downgoing samples of the vertical particle velocity wavefield.

Figure 4:
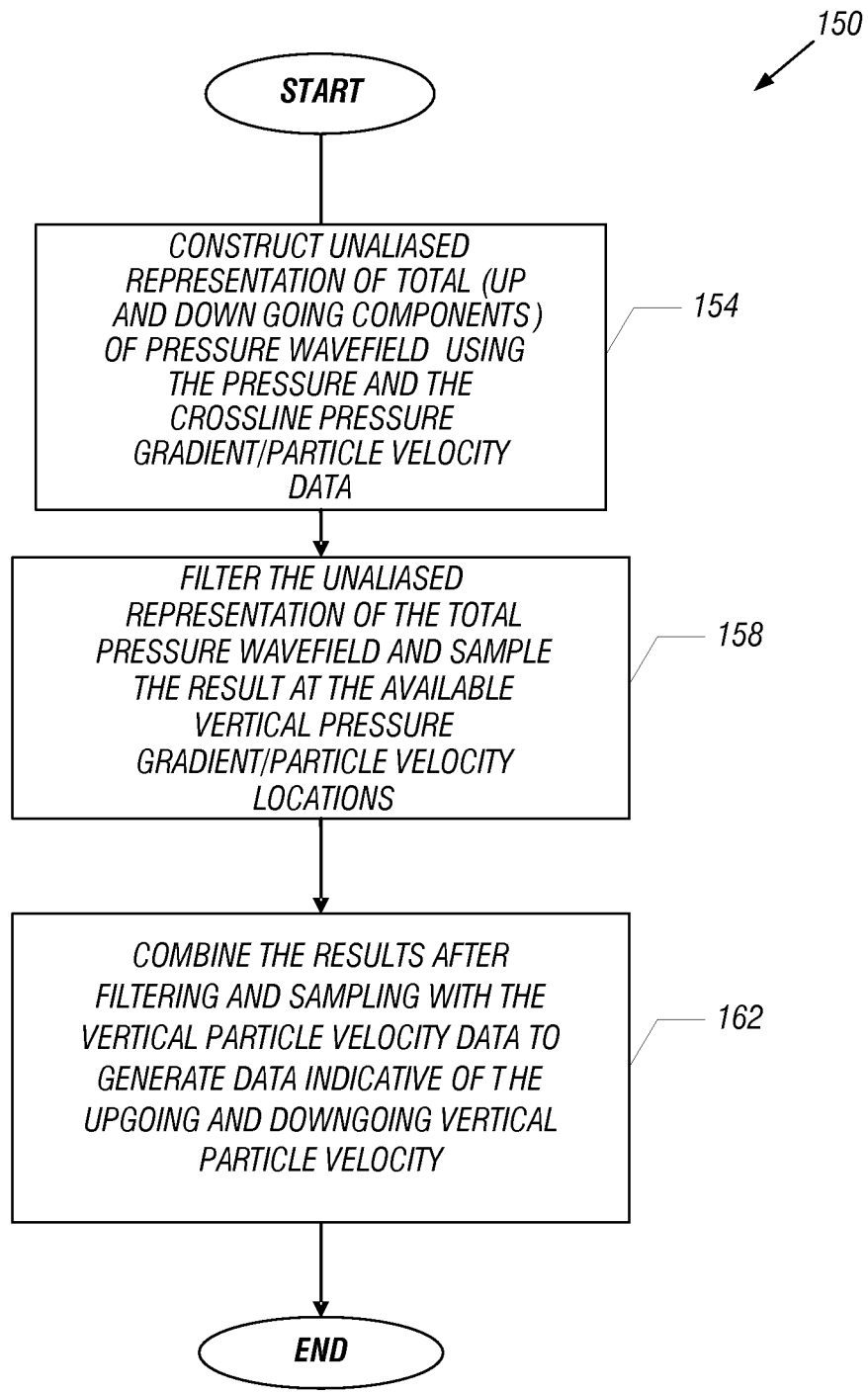
FIG. 4 is a flow diagram depicting a technique to generate data indicative of upgoing and downgoing components of a particle velocity wavefield in a crossline direction according to an embodiment of the invention.

Referring to FIG. 4, pursuant to the technique 150, an unaliased representation of the total (upgoing and downgoing components) of a pressure wavefield is constructed (block 154) using the pressure and the crossline pressure gradient/particle velocity data. Pursuant to block 158, the unaliased representation of the total pressure wavefield is filtered and the result is sampled at the available vertical pressure gradient/particle velocity locations, pursuant to block 158. The results from the filtering and sampling are combined (block 162) with the vertical particle velocity data to generate data, which are indicative of the upgoing and downgoing vertical particle velocity.

In addition to constructing unaliased continuous representations of upgoing wavefields, the techniques and systems that are disclosed herein may be applied to constructing wavefields other than the upgoing wavefields. More specifically, as long as the crossline aliased measured or computed up- and downgoing quantities can be related to the desired unaliased output wavefield (pressure, vertical particle velocity or otherwise) through a set of one or more linear filters, the techniques and systems that are disclosed herein may be applied. Therefore, the techniques and systems that are disclosed herein may be applied where the unaliased output quantities are pressure or the vertical or crossline component of a particle velocity, as these quantities may be related to the crossline aliased up- and downgoing wavefields through linear ghost operators, as described in U.S. patent application Ser. No. 12/131,870, entitled "JOINTLY INTERPOLATING AND DEGHOSTING SEISMIC DATA," which was filed on Jun. 2, 2008, and is hereby incorporated by reference in its entirety.

Figure 5:
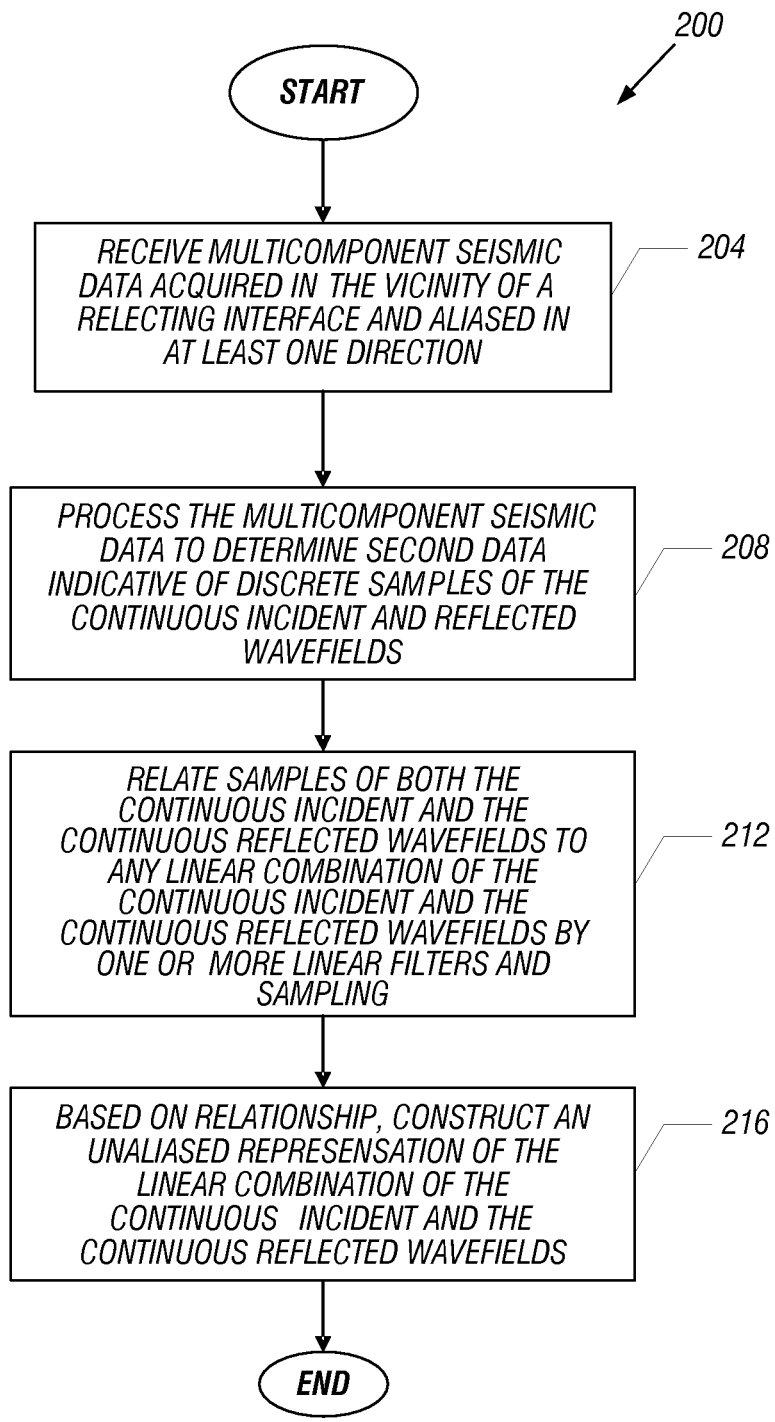
FIG. 5 is a flow diagram depicting a technique to construct an unaliased representation of a continuous seismic wave along a crossline direction according to an embodiment of the invention.

To summarize, although specific techniques and systems are disclosed herein for constructing the unaliased continuous upgoing component of the particle velocity wavefield, the techniques and systems may be more generalized, as depicted by a technique 200 that is illustrated in FIG. 5. Referring to FIG. 5, pursuant to the technique 200, multicomponent seismic data acquired in the vicinity of a reflecting interface and aliased in at least one direction are received, pursuant to block 204. The multicomponent seismic data are processed to determine (block 208) second data, which are indicative of discrete samples of a continuous incident and reflected wavefields. The samples of both the continuous incident and the continuous reflected wavefields are related (block 212) to a linear combination of the continuous incident and continuous reflected wavefields by one or more linear filters and sampling. Based on this relationship, an unaliased representation of the linear combination of the continuous incident and the continuous reflected wavefields is constructed, pursuant to block 216.

Embodiments other than those that are specifically described herein are contemplated and are within the scope of the appended claims. For example, although a towed seismic survey has been described herein, the techniques and systems that are disclosed herein may equally be applied to any other array of seismic sensor cables. For example, in accordance with other embodiments of the invention, the techniques and systems that are disclosed herein may be applied to a seabed-based or land-based array of seismic sensor cables. Furthermore, in accordance with some embodiments of the invention, the techniques and systems that are disclosed herein may be applied to seismic data that are acquired by seismic sensors that are not part of cables (sensors that are nodes of a wireless network, for example). Thus, many variations are contemplated and are within the scope of the appended claims.

Figure 6:
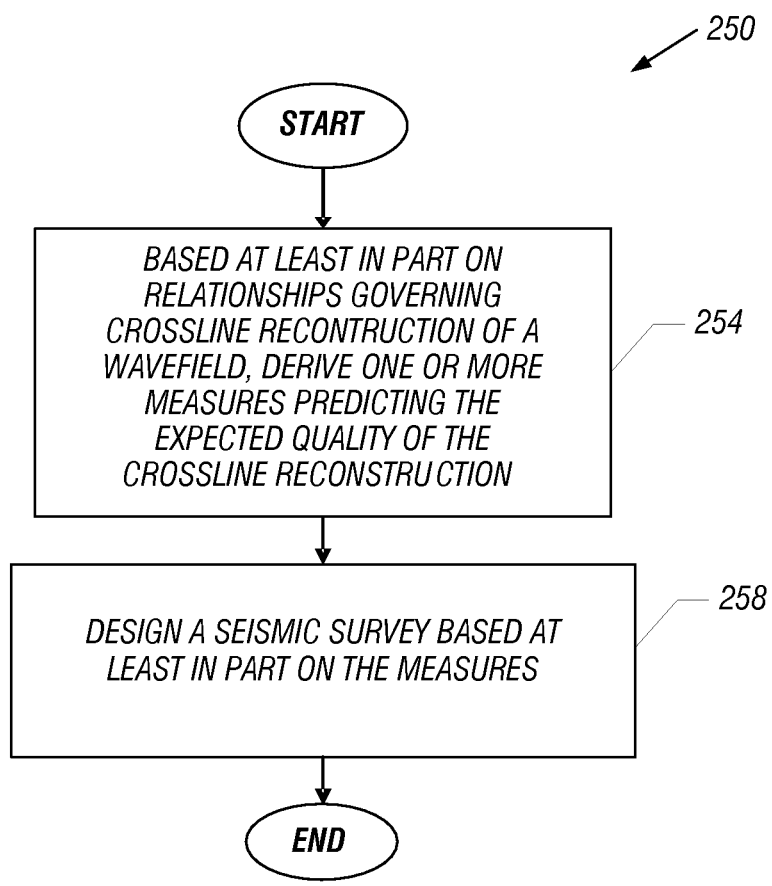
FIG. 6 is a flow diagram depicting a technique to design and perform a towed seismic survey according to an embodiment of the invention.

In accordance with some embodiments of the invention, the parameters of the seismic survey may be designed to enhance or facilitate the crossline construction that is described herein. More specifically, the determinant that is set forth in Eq. 8 is simply the difference between two complex exponential functions and depends on the crossline sampling distance (through c) and the streamer depth $z_r$. The determinant may be calculated without performing difficult inversions and/or integrals. Therefore, the determinant may be used to evaluate the stability of the inversion for different survey depths, frequencies and crossline sampling distances before any data have been acquired. Therefore, referring to FIG. 6, in accordance with some embodiments of the invention, a technique 250 includes based at least in part on the relationships governing crossline reconstruction of a wavefield, one or more measures, which predict the expected quality of the crossline reconstruction are derived, pursuant to block 254. As examples, these measures may be based on streamer depths, survey frequency and/or crossline spacing of the seismic survey. A seismic survey may then be designed, pursuant to block 258, based at least in part on the measures; and the survey may thereafter be conducted pursuant to its design.

Figure 7:
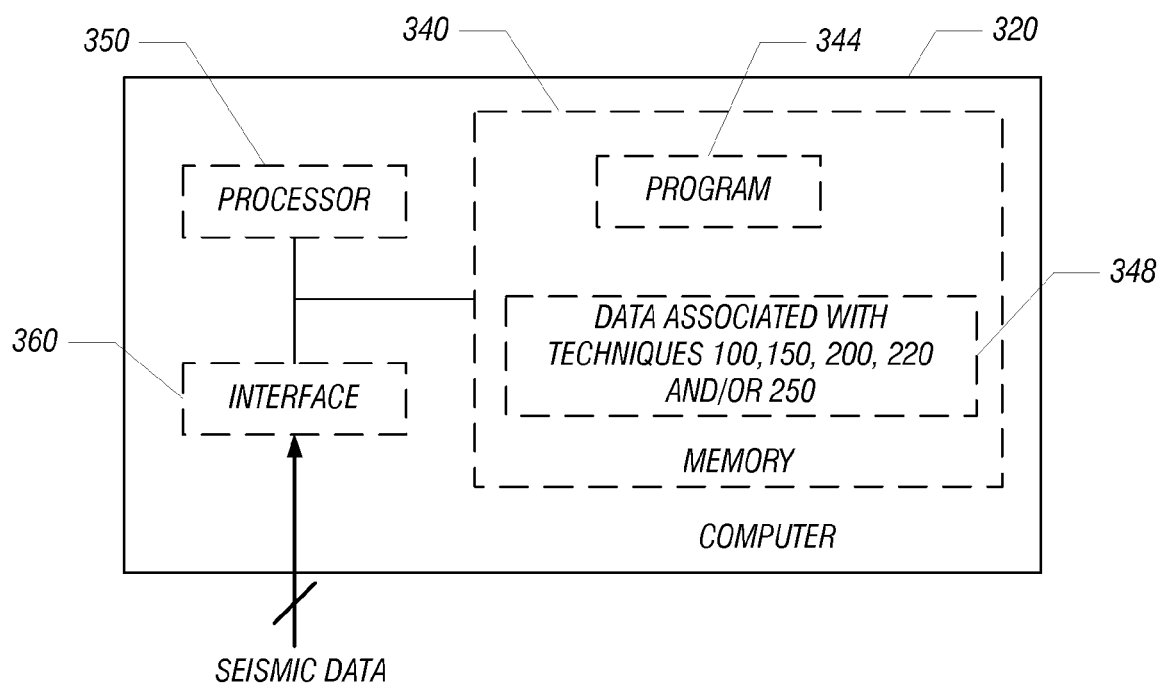
FIG. 7 is a schematic diagram of a processing system according to an embodiment of the invention.

Referring to FIG. 7, in accordance with some embodiments of the invention, a data processing system 320 may perform at least some parts of one or more of the techniques that are disclosed herein for such purposes (as non-limiting examples) of constructing an unaliased crossline representation of a seismic wavefield; determining data indicative of samples of upgoing and downgoing wavefield components; determining a continuous crossline representation of an upgoing particle velocity wavefield; designing parameters of a seismic survey; etc. In accordance with some embodiments of the invention, the system 320 may include a processor 350, such as one or more microprocessors and/or microcontrollers. As non-limiting examples, the processor 350 may be located on a streamer 30 (see FIG. 1), located on the vessel 20 (see FIG. 1) or located at a land-based processing facility, depending on the particular embodiment of the invention.

The processor 350 may be coupled to a communication interface 360 for purposes of receiving such data as the acquired seismic data. As examples, the communication interface 360 may be a Universal Serial Bus (USB) interface, a network interface, a removable media (such as a flash card, CD-ROM, etc.) interface or a magnetic storage interface (IDE or SCSI interfaces, as examples). Thus, the communication interface 360 may take on numerous forms, depending on the particular embodiment of the invention.

In accordance with some embodiments of the invention, the communication interface 360 may be coupled to a memory 340 of the system 320 and may store, for example, various input and/or output datasets involved in the determination of the above-described upgoing and downgoing wavefield samples; construction of an unaliased continuous seismic wavefield; survey design; etc. The memory 340 may store program instructions 344, which when executed by the processor 350, may cause the processor 350 to perform various tasks of one or more of the techniques and systems that are disclosed herein, such as the techniques 100, 150, 200 and/or 250; and the system 320 may display results obtained via the technique(s)/system(s) on a display (not shown in FIG. 7) of the system 320, in accordance with some embodiments of the invention.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method, comprising:
receiving seismic data acquired in a seismic survey in the vicinity of a reflecting interface, the survey having an associated undersampled direction;
providing first discrete samples representing an incident component of a continuous seismic wavefield along the undersampled direction and second discrete samples representing a reflected component of the continuous seismic wavefield along the undersampled direction;
relating the first and second discrete samples to a linear combination of the continuous incident and reflected seismic wavefield components using at least one linear filter; and
based on the relationship, constructing an unaliased representation of the linear combination of the continuous incident and reflected seismic wavefield components,
wherein at least one of the acts of receiving, providing, relating and constructing is performed on a processor-based machine.

2. The method of claim 1, wherein the act of relating is further based on a generalized sampling expansion theorem-based scheme.

3. The method of claim 1, further comprising:
processing the seismic data to generate the second discrete samples.

4. The method of claim 1, wherein the seismic data indicates the discrete samples.

5. The method of claim 1, wherein the continuous seismic wavefield comprises a particle velocity wavefield, and the first and second discrete samples comprise samples of an upgoing vertical component of the particle velocity wavefield and samples of a downgoing vertical component of the particle velocity wavefield.

6. The method of claim 1, wherein the continuous seismic wavefield comprises a pressure wavefield, and the first and second discrete samples comprise samples of an upgoing component of the pressure wavefield and samples of a downgoing component of the pressure wavefield.

7. The method of claim 1, wherein the act of providing comprises decomposing aliased discrete samples of a vertical particle velocity into upgoing and downgoing components.

8. The method of claim 1, wherein the act of providing comprises decomposing aliased discrete samples of a pressure wavefield into upgoing and downgoing components.

9. The method of claim 1, wherein the act of providing further comprises:
processing the seismic data to construct a substantially unaliased representation of a pressure wavefield;
filtering the pressure wavefield; and
applying results of the filtering to particle velocity measurements to generate the upgoing and downgoing vertical components of the particle velocity wavefield.

10. The method of claim 1, wherein the continuous seismic wavefield comprises an upgoing pressure wavefield, an upgoing crossline component of a particle velocity, or an upgoing inline component of a particle velocity.

11. The method of claim 1, wherein:
the first and second discrete samples comprise samples of an upgoing wavefield and samples of a downgoing wavefield, and
the upgoing wavefield and the downgoing wavefield are inter-related by a reflection at a horizontal interface.

12. The method of claim 1, wherein the act of constructing the unaliased representation of the continuous seismic wavefield comprises applying a generalized sampling expansion.

13. The method of claim 1, wherein the array of sensor cables comprise a seabed array or a towed array.

14. A system comprising:
an interface to receive seismic data acquired in a seismic survey in the vicinity of a reflected interface, the survey having an associated undersampled direction; and
a processor to:
process first discrete samples representing an incident component of a continuous seismic wavefield along the undersampled direction and second discrete samples representing a reflected component of the continuous seismic wavefield along the undersampled direction;
model the first and second discrete samples as being a linear combination of the continuous incident and reflected seismic wavefield components using at least one linear filter; and
based on the modeling, construct an unaliased representation of the linear combination of the continuous incident and reflected seismic wavefield components.

15. The system of claim 14, wherein the model is further based on a generalized sampling expansion theorem.

16. The system of claim 14, wherein the processor is adapted to process the seismic data to generate the second discrete samples.

17. The system of claim 14, wherein the seismic data indicates the second discrete data.

18. The system of claim 14, wherein the continuous seismic wavefield comprises a particle velocity wavefield, and the first and second discrete samples comprise samples of an upgoing vertical component of the particle velocity wavefield and samples of a downgoing vertical component of the particle velocity wavefield.

19. The system of claim 14, wherein the processor is adapted to decompose aliased discrete samples of a particle motion velocity into upgoing and downgoing vertical components of the particle velocity wavefield.

20. The system of claim 19, wherein the processor is further adapted to:
process the seismic data to construct a representation of a pressure wavefield;
filter the pressure wavefield; and
apply results of the filtering to particle velocity measurements to generate the upgoing and downgoing vertical components of the particle velocity wavefield.

21. The system of claim 14, wherein the continuous seismic wavefield comprises an upgoing pressure wavefield, an upgoing crossline component of a particle velocity, or an upgoing inline component of a particle velocity.

22. The system of claim 14, wherein the seismic data are acquired using an array of seismic sensors and the array comprise a seabed array or a towed array.

* * * * *